UNITED STATES PATENT OFFICE.

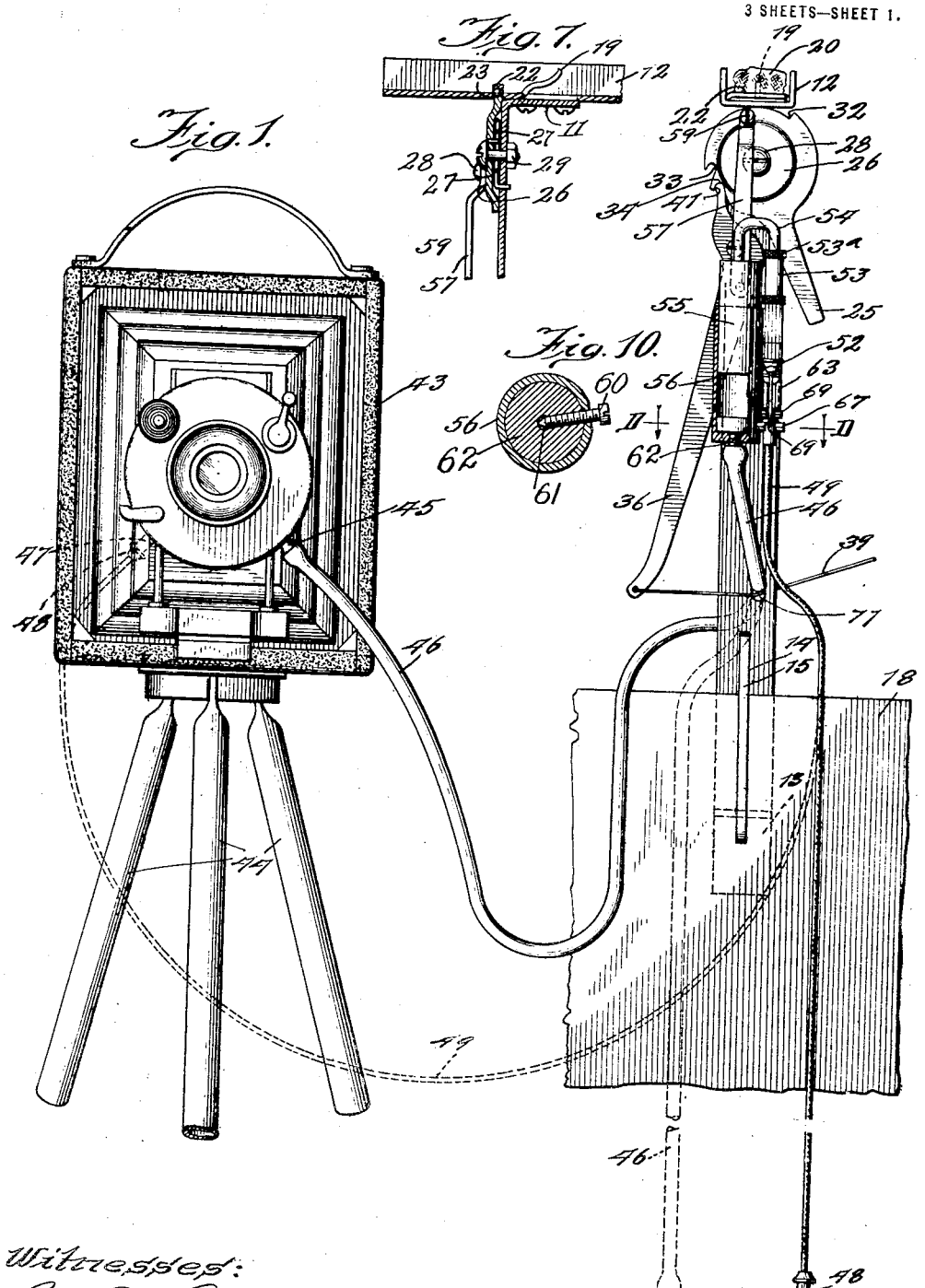

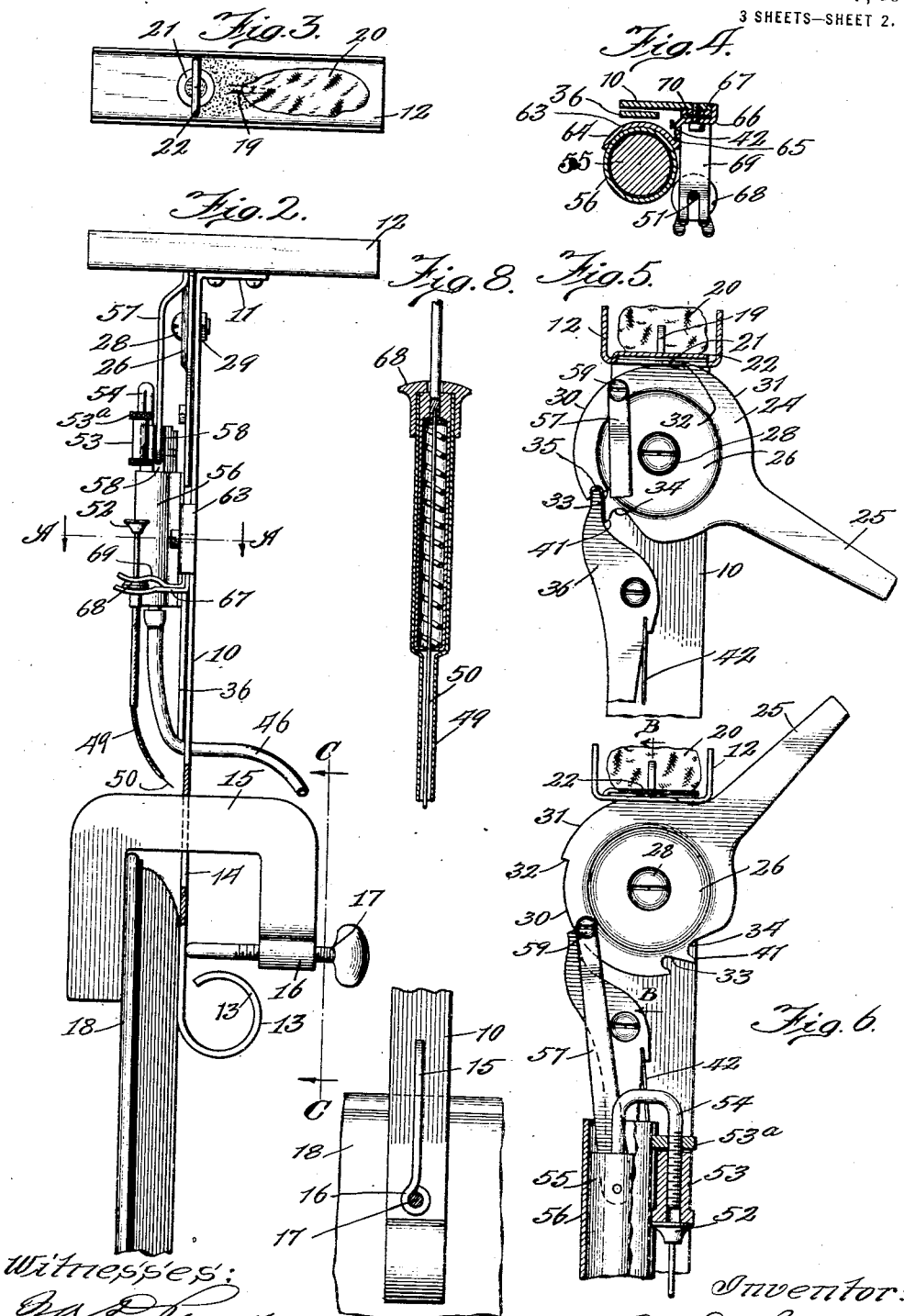

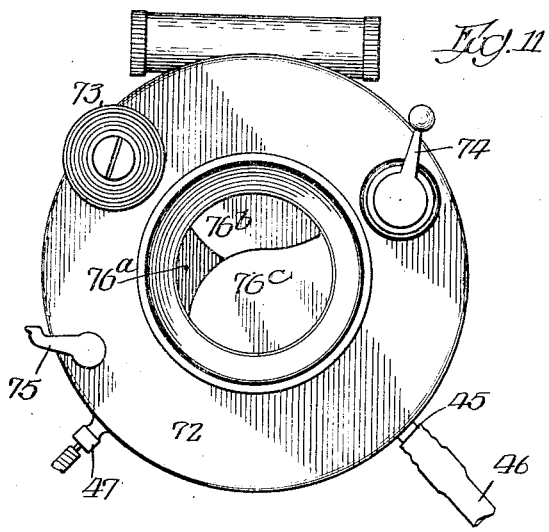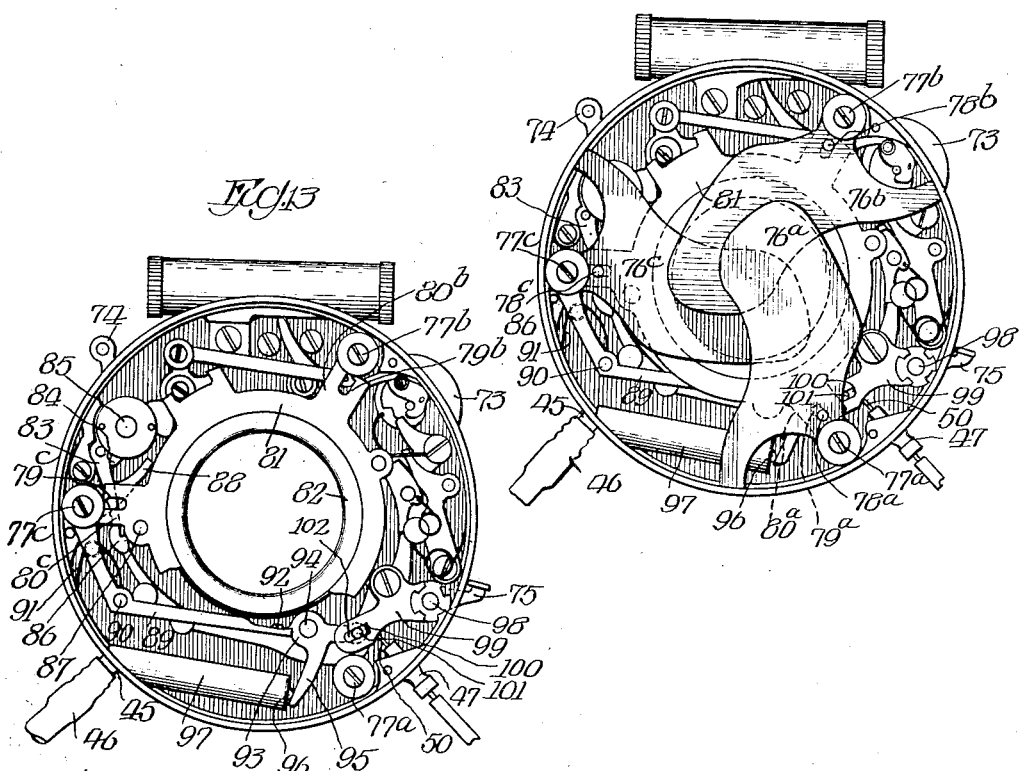

ASA W. STRAIGHT, OF CHICAGO, ILLINOIS.

PHOTOGRAPHER'S FLASH-LIGHT.

1,307,220. Specification of Letters Patent. Patented June 17, 1919.

Application filed February 8, 1915, Serial No. 6,675. Renewed November 18, 1918. Serial No. 263,112.

*To all whom it may concern:*

Be it known that I, ASA W. STRAIGHT, a citizen of the United States, and a resident of Chicago, in the county of Cook and State of Illinois, have invented certain new and useful Improvements in Photographers' Flash-Lights, of which the following is a full, clear, and exact specification.

My invention is concerned with photographers' flash lights that produce simultaneously the flash and the exposure, and is designed to produce a device of the class described that can be applied to cameras whether the shutter-actuating mechanism is operated by compressed air or by mechanical means.

My invention is further concerned with such a flash light that is constructed so that the flash must necessarily be set off in advance of the operation of the shutter, so that the exposure will occur at the period of greatest illumination.

My invention is further concerned with such a flash light that is provided with adjusting means for timing the exposure relative to the flash.

My invention is further concerned with such a flash light that is provided with adjusting means for determining the speed of operation of the light.

My invention is further concerned with such a flash light that can be readily operated from a distance, so that the person operating the light can be included in the picture, if desired.

My invention is further concerned with a flash light that is operated by a tension spring or other source of reserve power, so that no effort is required except that involved in releasing the trigger or detent.

My invention is further concerned with such a photographer's flash light that is operated by a tension spring or other source of reserve power, and provided with a releasing trigger or detent which is movable into a safety position, in which it cannot be accidentally fired while the light is being loaded, and a firing position, in which it can be readily released.

My invention is further concerned with a photographer's flash light that is fired by means of a percussion cap that cannot be inserted into the light until the trigger is locked in its safety position.

Finally, my invention is concerned with certain novel combinations of elements, as will be fully described in the specification and particularly pointed out in the claims.

To illustrate my invention, I annex hereto two sheets of drawings, in whch the same reference characters are used to designate identical parts in all the figures, of which,—

Figure 1 is a front elevation showing my flash light supported upon the back of a chair or other piece of furniture and connected to a camera, and ready to be fired;

Fig. 2 is a side elevation of the light;

Fig. 3 is a top plan view of the same;

Fig. 4 is a horizontal section on the line A—A of Fig. 2;

Figs. 5 and 6 are views of a portion of the light as seen in Fig. 1, but on a somewhat larger scale, and with the light in the safety or charging position in Fig. 5, and in the fired position in Fig. 6;

Fig. 7 is a vertical section on the line B—B of Fig. 6;

Fig. 8 is a vertical section, on an enlarged scale, through a portion of the mechanical shutter-actuating connections;

Fig. 9 is a view in section on the line C—C of Fig. 2;

Fig. 10 is a section on the line D—D of Fig. 1;

Fig. 11 is a front view of the shutter-casing of the Koilos camera, to which I have shown my invention as applied;

Fig. 12 is a rear view of the same, with the shutter-blades in place; and

Fig. 13 is a similar view, with the shutter-blades removed to show the parts beneath the same.

The light mechanism is all mounted upon a vertical supporting plate or standard 10, which preferably consists of a strip of sheet-metal having a horizontal flange 11 at its upper end, upon which is screwed or otherwise secured the trough 12 in which the powder is placed. The bottom of the handle is preferably turned into a substantially complete circle, as seen at 13, through which a finger may be passed when the light is held in the hand. Above this portion 13 is an elongated slot 14, which is provided for use when the light is to be secured to a piece of furniture, such as the top of a chair, as seen in Figs. 1 and 2, in which case I pass through this slot 14 the sheet-metal clamping member 15, which is of a generally inverted U-shape and has the eye 16 formed by turning over one end and interiorly threading the same, so that the set screw 17 may be passed through said threaded end and against the handle 10 just above the hook 13 to clamp said handle to the top 18 of a chair or other piece of furniture.

The trough 12 has a prong 19 struck up from its bottom over the flange 11, onto which prong the paper envelop 20, which contains the flash powder, is thrust, so that the envelop will be held firmly in the trough and perforated at a point so that some of the powder will extend over into the position of the paper cap 21, shown in Fig. 3. This paper cap 21 is held beneath a tongue 22, which is struck up from the bottom of the trough 11 and is preferably formed with a groove 23 on its under side, as seen in Fig. 7. Coöperating with the groove and serving to fire the cap is the hammer 24, which preferably consists of a sheet-metal disk having the arm 25 by which it is manipulated, and the dished circular portion 26, in which is mounted the spiral spring 27, one end of which is secured to the hammer, while the other end is secured to the standard 10 on which the hammer is pivoted by the bolt 28 held tightly against the handle 10 by the nut 29. The bolt 28 has a shoulder resting against the plate 10, so that the hammer is loosely journaled on the bearing formed by the bolt. The hammer has the reduced curved portion 30 connected with the similar unreduced portion 31 by the firing offset 32, said portions 30 and 31 being curved on the arcs of circles having radii of different lengths with the bolt 28 as their center. At the other end of the reduced portion 30 is the safety-catch recess 33, and just beyond this is the firing recess 34, into which the tip 35 of the trigger 36 is placed when the light is to be fired directly by pressing on the lower handle end 38 of the trigger. When the light is to be fired at a distance by the string 39 secured in the aperture 40 at the lower end of the trigger, the end of the trigger is drawn slightly out of the firing recess 34 so that its tip, which is tangent to the arc of the circle through which it swings, engages the hair-trigger surface 41, which, when the hammer is in this position, is parallel to the hair-trigger surface of the hammer, so that a very slight pull on the string 39 will operate the trigger to release the hammer. This trigger is held in engaging position with the safety-catch notch 33 or with the firing notch 34 by the leaf spring 42, which has one end secured to the inside of the trigger member and its other end resting against a fixed abutment, as will be explained.

After the light has been fired and the parts are in the position shown in Fig. 6, the unreduced portion 31 extends into the groove 23 and it is impossible to insert a cap into the firing position, and this is true until the hammer has been swung around to the position shown in Fig. 5, where the trigger 36 catches in the safety notch 33, and with the hammer thus securely caught and held, the cap 21 can be inserted, as the reduced portion 30 is now beneath the tongue 22. After the cap has been placed, and the paper envelop or cartridge 20 with the flash powder put in position, the hammer is then swung on and adjusted carefully in the hair-trigger position shown in Fig. 7, if it is to be operated by the string; or into the position in which the tip 35 of the trigger coöperates with the firing notch 34, if it is to be operated by direct pressure of the finger on the trigger. When the trigger is pressed or moved by the string, it is released from the firing notch, and the spring 27 throws the hammer around violently to bring the firing shoulder 32 into engagement with the cap to explode the same and ignite the flash powder.

The mechanism thus far described serves to fire the powder, but it is desirable to simultaneously cause an exposure of the plate or film in the camera 43, which is shown as mounted upon a tripod 44. Of course, the light can be applied to any form of a camera, and I have shown the shutter casing as provided with the nipple 45, to which the customary rubber tube 46 is applied, where the shutter is to be operated by squeezing a bulb. I have also shown the shutter casing as provided with the customary nipple 47, upon which the spring catch 48 of the operating end of the customary mechanical connection 49 may be secured in the customary manner. As will be subsequently explained, a puff of air may be passed through the tube 46, or an impact may be given to the wire 50 running through the mechanical connection 49, so that the light is adapted for use in connection with those shutters that have only the nipple 45 for connection with a rubber bulb, or those which are provided only with the nipple 47, to which the mechanical connection 49 is adapted to be secured. Some shutters are provided with both nipples 45 and 47, in which case the light might be connected to operate the shutter in both ways, although, obviously, only one is necessary. In Fig. 1, I have shown the light with the rubber-tube connection in operative position in full lines, and disconnected in dotted lines, and with the mechanical connection 49 disconnected in full lines and connected in dotted lines.

To give the impact to the light end 51 of the wire 50, which end is preferably provided with the button 52, I provide the cylinder 53, which is preferably threaded onto one arm of the U-shaped wire 54, and secured in any position of adjustment by a lock-nut 53ª, the other end of which is secured in the plunger 55 reciprocating in the cylinder 56, which plunger is reciprocated by the link 57 pivoted at its lower end in a slot 58 in the plunger, while its upper end is pivotally connected by the screw 59 to the hammer 24. A set screw 60 having a tapered end is threaded through the bottom of the cylinder and may be adjusted so as to close partially or entirely the aperture 61 through the bottom of the cylinder and formed in the nipple 62, on which the end of the rubber tube 46 is secured when the air pressure is used to release the shutter. When the mechanical means is employed for this purpose, by adjusting the position of the screw 60 to regulate the size of the opening, the rapidity with which the plunger descends can be controlled, and thus the interval between the ignition of the charge and the exposure of the plate regulated. The sequence of the ignition of the flash powder and the exposure of the plate can be determined by screwing the cylinder 53 up and down on the threaded rod, the length of the threaded portion of the rod and its position being such that it may be arranged to contact with the button 52 at the instant the shoulder 32 engages the cap or at some time afterward. This adjustability of the cylinder 53 also enables me to regulate the extent of the movement given to the wire 50.

When the mechanical means of releasing the shutter are employed, the cylinder and plunger may also be used as a time regulating element in the complete combination; but where the compressed-air method of operation is employed, this cylinder is also employed to compress the air by the sudden descent of the plunger, and to transmit the compressed air through the tube 46 to the shutter-releasing means, the plunger and cylinder under these conditions acting like the ordinary rubber bulb, except that the compression is effected by the action of the spring 27 when the trigger releases the hammer, instead of by the direct pressure on the bulb. It will of course be understood that the time of exposure relative to the ignition can be regulated to a nicety by adjusting the screw 60, as the more it throttles the aperture 61, the longer will be the interval between the ignition and the exposure.

The cylinder 56 is preferably secured by soldering, brazing or otherwise, to the plate 63, which has the curved portion 64 to which the cylinder is secured, the offset 65 against which the lower end of the spring 42 abuts, and the angular portion 66 which fits over the edge of the bar 10, and serves to hold the generally L-shaped bracket 67, formed of sheet metal and having the fork to receive the cap 68 of the mechanical connection, and the similar L-shaped spring 69, which also has the fork-shaped end coöperating with the forked end of the bracket 67 so as to form a spring clamp for said cap 68. With the bracket arrangement here shown, a single screw 70 passed through the apertures in the angular portion 66 of the bracket 63, the spring 69 and the bracket 67, and screwed into the bar 10, serves to hold all the parts together, thus making a cheaply and quickly constructed arrangement and attachment for the various elements thus secured together. The slightly elongated oval aperture 71 is provided in the bar 10 at the point shown, and may serve the double function of having the tube 42 passed therethrough and held therein so as to prevent any accidental cramping of the tube, as the latter fits snugly enough in the aperture so that it will stay in the position in which it is placed. For the passage of the tube only, the aperture might be circular, but I preferably elongate it slightly, as stated, so that the cord 39 can also be passed therethrough, and thus guided as may be necessary in giving it the proper angle so that the pull of the trigger 36 will be in the proper direction, while the string beyond the aperture is at right angles to the portion between the aperture and the trigger.

The details of the shutter and shutter-operating mechanism which may be employed, which, *per se*, form no part of my invention, are shown in Figs. 11 to 13, where the shutter-casing 72 has the customary exposure-regulating disk 73, which may be adjusted to regulate the time of the automatic exposure by turning it to any of the various indications. It also has the customary setting lever 74, which is swung down to the dotted-line position to set the various elements ready for an automatically regulated short-time exposure. It also has the operating lever 75, which is swung down manually to the dotted-line position when the shutter is tripped manually.

Referring now to Fig. 12, the three shutter-blades 76$^a$, 76$^b$ and 76$^c$ are seen as pivoted on the bearing studs 77$^a$, 77$^b$ and 77$^c$, and as having the studs 78$^a$, 78$^b$ and 78$^c$ extending into the short radial slots 79$^a$, 79$^b$ and 79$^c$ formed in the radial arms 80$^a$, 80$^b$ and 80$^c$ projecting from the annulus 81 mounted to swing slightly on the annular bearing 82 forming a part of the shutter-casing 72. This swinging movement of the annulus 81, which is just sufficient to swing the shutter-blades 76$^a$, 76$^b$ and 76$^c$ from over the aperture in the bearing 82 and back, is controlled during the automatic operation of the shutter (with which the present invention alone is concerned) by the dog 83 pivoted on an arm 84 carried by the shaft bearing 85 of the lever 74. The hook end 86 of the dog 83 engages the stud 87 projecting from the arm 80$^c$ into the plane of the hook 86. A suitable spring is tensioned by the setting of the lever 74, and the annulus 81 moves with the dog 83 as the latter moves down and back during the return of the lever 74 from its set position.

The return movement of the lever 74 is controlled by the dog 88, pivoted concentrically with the shutter-blade 76ᶜ, which, when the lever 74 is set, engages a shoulder (not shown) on the arm 84. An angular arm 89, rigid with the dog 88, is engaged at the pin 90 by a spring 91, which holds the dog 88 in engaging position, and its end engages a lug 92 on a three-armed lever 93 pivoted on a stud 94. The arm 95 of this lever 93 engages the end 96 of the plunger or piston sliding in the air cylinder 97, into which the nipple 45 opens, so that when the air is compressed in the tube 46 by the plunger 55, as before explained, the lever 93 is rocked to move the dog 88 to release the lever 74 and cause the shutter to operate. The lever 75 is secured on the shaft 98, which has the arm 99 with the slot 100 therein, into which extends the pin 101 carried by the arm 102 of the lever 93, so that the lever 74 can also be released by swinging the lever 75. The inner end of the wire 50 engages the under side of the arm 99, so that the mechanical connections 49 will, when it is operated, also serve to release the shutter through the same train of connections as the air-pressure device.

While I have shown and described my invention as embodied in the form which I at present consider best adapted to carry out its purposes, it will be understood that it is capable of modifications, and that I do not desire to be limited in the interpretation of the following claims except as may be necessitated by the state of the prior art.

What I claim as new, and desire to secure by Letters Patent of the United States, is:

1. In a device of the class described, the combination with a camera having a shutter, of an element operated by air pressure, connections between said shutter and element so that as the air pressure on said element is changed the shutter will be operated, a reciprocating element, connections between said reciprocating element and the connections to the shutter so that as the former is moved the latter will be operated, a flash pan, means for firing a charge in said pan, and connections from said means to said air-pressure element and said reciprocating element whereby the pressure of the air of said air-pressure element will be varied or the reciprocating element will be moved as the charge is fired.

2. In a device of the class described, the combination with a flash pan having a cap holder associated therewith, of an element movable on the flash pan support to explode the cap and thereby ignite the contents of the pan, a flexible reciprocating element extending from the flash pan support to and adapted to coöperate with a camera shutter operating mechanism, connections having lost motion between the movable element and reciprocating element so that when the former is moved the reciprocating element will alternately be operated, and means for regulating the amount of lost motion to vary the amount of movement given to the reciprocating element.

3. In a device of the class described, the combination with a flash pan, of a cap-holder associated therewith, an element the movement of which fires the cap, a safety position for said element, a set position for said element, and means for preventing the insertion of the cap until the element has been moved at least to the safety position or to the set position.

4. In a device of the class described, the combination with a flash-pan, of a cap-holder thereon, a support for the pan, a cap-engaging element movable on the support to explode the cap and thereby ignite the contents of the pan, a speed-controlling mechanism also mounted on the support, a reciprocating element also carried by the support adapted to coöperate with a camera-shutter operating mechanism, and connections between the cap-engaging element and the speed-controlling mechanism and reciprocating element so that when the cap-engaging element is moved the speed-controlling mechanism is first moved and the reciprocating element will thereafter be operated.

5. In a device of the class described, the combination with a flash-pan, of a cap-holder carried thereby, a support for the pan, a cap-engaging element movable on the support to explode the cap and thereby ignite the contents of the pan, a reciprocating element also carried by the support adapted to coöperate with a camera-shutter operating mechanism, connections between the cap-engaging element and the reciprocating element so that when the former is moved the reciprocating element will be operated, and means also carried by the support for regulating the speed of the cap-engaging element.

6. In a device of the class described, the combination with a flash pan, of a swinging element movable to ignite the contents of the pan, a spring put under tension when the swinging element is moved to its cocked position, a trigger coöperating with the swinging element, a cylinder, a piston in the cylinder, and a link connecting the piston and swinging element.

7. In a device of the class described, the combination with a flash pan, of a swinging element movable to ignite the contents of the pan, a spring put under tension when the swinging element is moved to its cocked position, a trigger coöperating with the swinging element, a cylinder, a piston in the cylinder, a link connecting the piston and swinging element, and an operating arm connected to the piston.

8. In a device of the class described, the combination with a flash pan, of a swinging element movable to ignite the contents of the pan, a spring put under tension when the swinging element is moved to its cocked position, a trigger coöperating with the swinging element, a cylinder, a piston in the cylinder, a link connecting the piston and swinging element, an operating arm connected to the piston, and means for adjusting the effective position of said arm.

9. In a device of the class described, the combination with a frame, of a flash pan secured on the upper end thereof, a firing element pivoted on the frame and coöperating with the flash pan and having a safety-catch recess and a firing shoulder, a spring interposed between the filling element and the frame, and a trigger pivoted on the frame and coöperating with the safety-catch recess and firing shoulder.

10. In a device of the class described, the combination with a frame, of a flash pan secured on the upper end thereof, a firing element pivoted on the frame and coöperating with the flash pan and having a safety-catch recess and a firing shoulder, a spring interposed between the firing element and the frame, a trigger pivoted on the frame and coöperating with the safety-catch recess and firing shoulder, and means for securing said frame to a support.

11. In a device of the class described, the combination with a flash pan, of a tongue for holding a cap therein, a firing hammer movable into engagement with a cap held beneath said tongue and having a safety-catch recess and a firing recess, a motor for moving said hammer, and a trigger having a tip adapted to enter the safety-catch recess when the hammer is in the position in which the cap can be inserted, or to enter the firing recess for releasing the hammer to allow the motor to move it.

12. In a device of the class described, the combination with a flash pan, of a tongue for holding a cap therein, a firing hammer movable into engagement with a cap held beneath said tongue and having a safety-catch recess and a firing recess with a hair-trigger shoulder associated therewith, a motor for moving said hammer, and a trigger having a tip adapted to enter the safety-catch recess or to enter the firing recess for releasing the hammer to allow the motor to move it, or to engage the hair-trigger shoulder to secure an easy release of the hammer.

13. In a device of the class described, the combination with a flash pan, of a tongue for holding a cap therein, a firing hammer movable into engagement with a cap held beneath said tongue and having a safety-catch recess and a firing recess with a hair-trigger shoulder associated therewith, a motor for moving said hammer, and a trigger having a tip adapted to enter the safety-catch recess or to enter the firing recess for releasing the hammer to allow the motor to move it, or to engage the hair-trigger shoulder to secure an easy release of the hammer, a portion of said hammer engaging the tongue so closely as to prevent the insertion of the cap before the hammer is moved far enough to permit the trigger to enter the safety-catch recess.

14. In a device of the class described, the combination with a flash pan having a slot through the bottom thereof and means for holding a cap on said slot, of a support for the pan, a generally circular hammer pivoted on the support beneath the slot and having its body provided with a firing shoulder connecting two portions formed on the arcs of circles of different radii, the portion having the lesser radius not entering the slot, while that having the greater radius does, a motor for swinging the hammer, and means for controlling the movement of the hammer by the motor.

15. In a device of the class described, the combination with a flash pan having a slot through the bottom thereof and means for holding a cap on said slot, of a support for the pan, a generally circular hammer pivoted on the support beneath the slot and having its body provided with a firing shoulder connecting two portions formed on the arcs of circles of different radii, the portion having the lesser radius not entering the slot, while that having the greater radius does, said hammer having firing and safety catch recesses in the portion of lesser diameter, a spring to rotate the hammer, and a trigger having a nose coöperating with the firing and safety catch recesses, the recesses being so located relative to the shoulder that the portion of greater diameter is in the slot after firing until the hammer has been rotated back at least to the safety catch position.

16. In a device of the class described, the combination with a flash pan having a slot through the bottom thereof and means for holding a cap on said slot, of a support for the pan, a hammer pivoted on the support beneath the slot and having its body provided with a firing shoulder adapted to pass through the slot and engage the cap directly to explode the same, a motor for swinging the hammer, means for controlling the movement of the hammer by the motor, a cylinder on the support below the pan, a piston reciprocating in the cylinder, and a link pivoted eccentrically on the hammer at one end and at the other end connected to the piston.

17. In a device of the class described, the combination with a flash pan having a slot through the bottom thereof and means for holding a cap on said slot, of a support for the pan, a hammer pivoted on the support beneath the slot and having its body provided with a firing shoulder adapted to pass through the slot and engage the cap directly to explode the same, a motor for swinging the hammer, means for controlling the movement of the hammer by the motor, a cylinder on the support below the pan, a piston reciprocating in the cylinder, a link pivoted eccentrically on the hammer at one end and at the other end connected to the piston, and an actuating member attached to the piston by a U-shaped connection.

18. In a device of the class described, the combination with a flash pan having a slot through the bottom thereof and means for holding a cap on said slot, of a support for the pan, a hammer pivoted on the support beneath the slot and having its body provided with a firing shoulder adapted to pass through the slot and engage the cap directly to explode the same, a motor for swinging the hammer, means for controlling the movement of the hammer by the motor, a cylinder on the support below the pan, a piston reciprocating in the cylinder, a link pivoted eccentrically on the hammer at one end and at the other end connected to the piston, and an actuating member attached to the piston by a U-shaped connection, said member being threaded on the connection for adjusting purposes.

19. In a photographer's flash gun, the combination with a support, of a flash pan provided with cap-holding means carried thereby, a reciprocating member having a firing shoulder to engage the cap in the first part of its movement, an element movable to operate a shutter to make an exposure, and connections between the member and element to move the latter in the latter part of the movement of the former after the ignition of the flash.

20. In a photographer's flash gun, the combination with a support, of a flash pan provided with cap-holding means carried thereby, a reciprocating member having a firing shoulder to engage the cap in the first part of its movement, an element movable to operate a shutter to make an exposure, and adjustable lost-motion connections between the member and element to move the latter in the latter part of the movement of the former at a regulable time after the ignition of the flash.

21. In a photographer's flash gun, the combination with a support, of a flash pan provided with cap-holding means carried thereby, a reciprocating member having a firing shoulder to engage the cap in the first part of its movement, an air-compressing cylinder on the support having a piston therein, and a link connecting the piston and member to compress the air after the ignition of the flash.

22. In a photographer's flash gun, the combination with a support, of a flash pan provided with cap-holding means carried thereby, a reciprocating member having a firing shoulder to engage the cap in the first part of its movement, an air-compressing cylinder on the support having a piston therein, a link connecting the piston and member to compress the air after the ignition of the flash, and means to regulate the rapidity of the movement of the piston in the cylinder.

23. In a photographer's flash gun, the combination with a support, of a flash pan carried thereby provided with cap-holding means, a reciprocating member having a firing shoulder to engage the cap in the first part of its movement, an air-compressing cylinder on the support having a piston therein, a link connecting the piston and member to compress the air after the ignition of the flash, an element movable to operate a shutter to make an exposure, and adjustable lost-motion connections between the element and the piston to move the latter in the latter part of the movement of the piston after the flash.

In witness whereof, I have hereunto set my hand and affixed my seal, this fifth day of February, A. D. 1915.

ASA W. STRAIGHT. [L. S.]

Witnesses:
JOHN HOWARD MCELROY,
MILDRED ELSNER.